(12) United States Patent
Speich et al.

(10) Patent No.: US 11,399,465 B2
(45) Date of Patent: Aug. 2, 2022

(54) SWATH AERATOR DEVICE AND AGRICULTURAL MACHINE EQUIPPED WITH SUCH A DEVICE

(71) Applicant: KUHN S.A., Saverne (FR)

(72) Inventors: Cedric Speich, Altekendorf (FR); Victor Cottet, Malbouhans (FR)

(73) Assignee: KUHN S.A., Saverne (FR)

( * ) Notice: Subject to any disclaimer, the term of this patent is extended or adjusted under 35 U.S.C. 154(b) by 292 days.

(21) Appl. No.: 16/606,057

(22) PCT Filed: Apr. 17, 2018

(86) PCT No.: PCT/FR2018/050957
§ 371 (c)(1),
(2) Date: Oct. 17, 2019

(87) PCT Pub. No.: WO2018/193200
PCT Pub. Date: Oct. 25, 2018

(65) Prior Publication Data
US 2021/0161072 A1   Jun. 3, 2021

(30) Foreign Application Priority Data
Apr. 18, 2017   (FR) .................................... 17 53355

(51) Int. Cl.
*A01D 78/02*   (2006.01)

(52) U.S. Cl.
CPC .................................. *A01D 78/02* (2013.01)

(58) Field of Classification Search
CPC .... A01D 78/02; A01D 78/002; A01D 78/003; A01D 87/04; A01D 89/002;
(Continued)

(56) References Cited

U.S. PATENT DOCUMENTS

| 309,779 | A | * | 12/1884 | Garfield | ................. | A01D 78/02 |
| | | | | | | 56/372 |
| 491,641 | A | * | 2/1893 | Gardner | ............... | A01D 61/008 |
| | | | | | | 198/613 |

(Continued)

FOREIGN PATENT DOCUMENTS

| DE | 27 57 328 A1 | 6/1978 |
| DE | 102016009007 A1 | * 2/2018 ........... A01D 89/005 |

OTHER PUBLICATIONS

International Search Report dated May 30, 2018 in PCT/FR2018/050957 filed Apr. 17, 2018.

*Primary Examiner* — Thomas B Will
*Assistant Examiner* — Madeline I Runco
(74) *Attorney, Agent, or Firm* — Oblon, McClelland, Maier & Neustadt, L.L.P.

(57) ABSTRACT

A plant lifting device is mounted on an agricultural machine and includes a drum that is articulated to a frame around a first substantially horizontal axis and which includes a substantially cylindrical casing that has openings through which seizing means intended to lift plants situated outside the casing are able to protrude. A rotor is provided onto which the seizing means are fastened and that is able to be driven in rotation relative to the frame around a second axis directed substantially parallel to the first axis and separate from it, in which, when the device is operated, the second axis is fixed relative to the first axis. A rotational movement transmission means includes at least one rod articulated to the drum on one hand and to the rotor on another hand.

12 Claims, 8 Drawing Sheets

Figure 1:
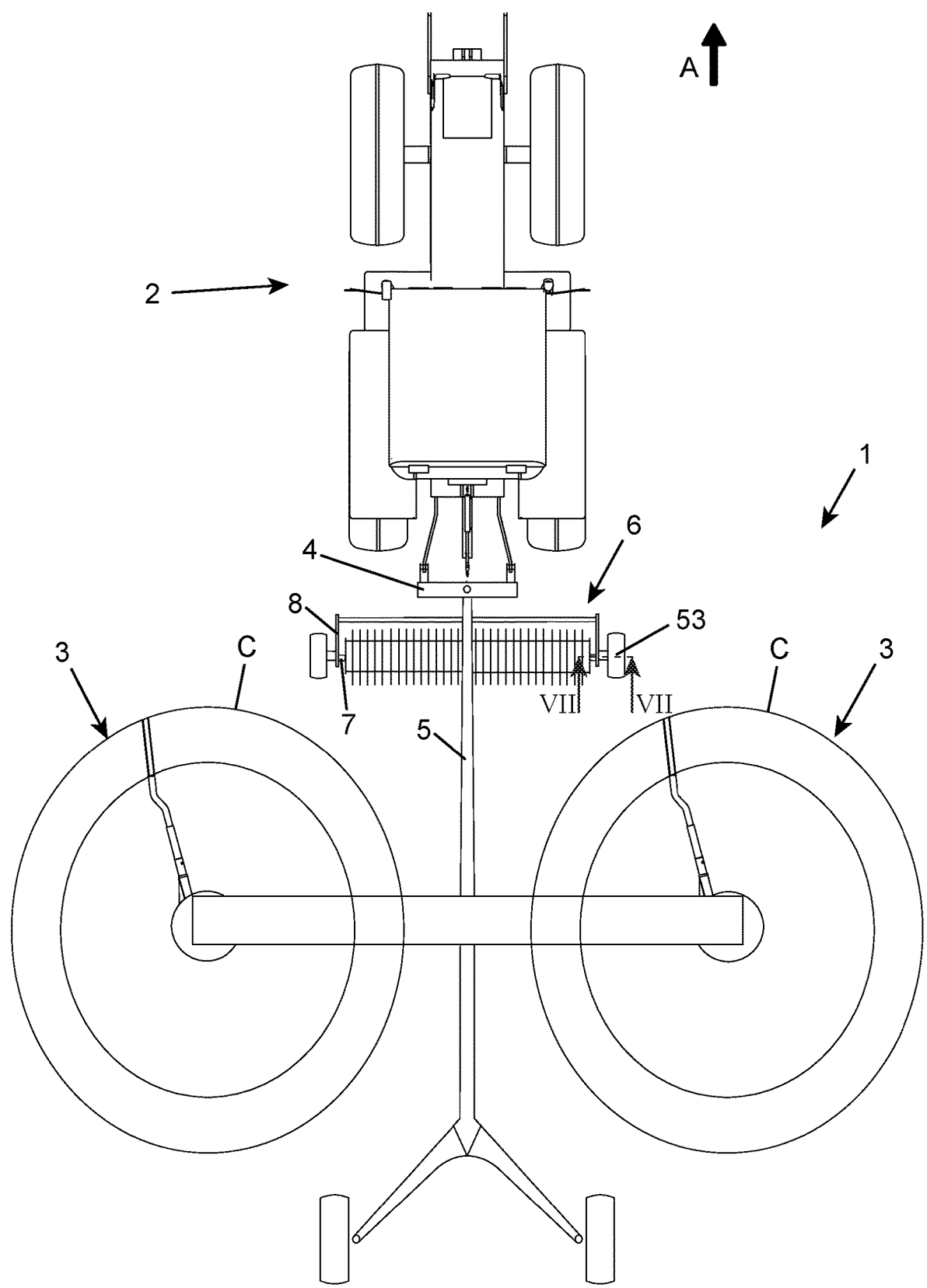

(58) Field of Classification Search
CPC .. A01D 89/005; A01D 89/007; A01D 89/008; A01D 43/02; A01D 43/04; A01D 57/02; A01D 57/025; A01D 57/03; A01D 57/28; A01D 57/30; A01D 78/00–78/20
See application file for complete search history.

(56) References Cited

U.S. PATENT DOCUMENTS

| | | | | |
|---|---|---|---|---|
| 2,071,627 | A * | 2/1937 | Hawn | A01D 57/04 56/221 |
| 2,476,183 | A * | 7/1949 | Fergason | A01D 78/02 56/377 |
| 2,549,086 | A * | 4/1951 | Harrer | A01D 78/02 403/379.4 |
| 2,657,518 | A * | 11/1953 | Hill | A01D 78/02 56/377 |
| 3,512,348 | A * | 5/1970 | Fritz | A01D 57/03 56/226 |
| 3,766,725 | A * | 10/1973 | Marsh | A01D 89/002 56/364 |
| 4,751,809 | A * | 6/1988 | Fox | A01D 57/02 56/220 |
| 4,936,082 | A * | 6/1990 | Majkrzak | A01D 57/02 56/220 |
| 5,768,870 | A * | 6/1998 | Talbot | A01D 57/03 56/220 |
| 6,640,527 | B2 * | 11/2003 | Farley | A01D 61/008 56/12.4 |
| 7,757,470 | B2 * | 7/2010 | Schumacher | A01D 57/02 56/220 |
| 9,392,747 | B2 * | 7/2016 | Patterson | A01D 61/008 |

* cited by examiner

SWATH AERATOR DEVICE AND AGRICULTURAL MACHINE EQUIPPED WITH SUCH A DEVICE

The present invention relates to the general technical field of agricultural machinery and in particular the field of harvesting machines. The invention concerns a device for lifting plants such as grass, straw or hay and intended to be mounted on an agricultural machine including in particular:

- a drum articulated to a frame around a first substantially horizontal axis and which includes a substantially cylindrical casing with openings through which seizing means intended to lift plants situated outside the casing are able to protrude,
- a rotor onto which the seizing means are fastened and which is able to be driven in rotation relative to the frame around a second axis directed substantially parallel to the first axis and separate from the latter, in which, when the device is operated, the second axis is fixed relative to the first axis,
- and rotational movement transmission means.

The invention also concerns an agricultural harvesting machine including such a plant lifting device.

The document FR2792496 proposes a plant lifting device of this type: when the device is operated, the rotor and the casing are driven in rotation and the seizing means, comprised of teeth, pick the plants up from the ground, lift them and throw them rearwards above the device. When the device is operated, the rotor and the casing revolve around respective axes at equal rotational speeds and in the same rotational direction. In the machine described in the document FR2792496, the rotational movement transmission means are comprised of pinions, gear rings and chains. This type of lifting device is very cumbersome and requires a high number of parts, which involves complex and costly assembly and maintenance. In addition, it requires regular servicing that is difficult to perform due to the difficulty of accessing the movement transmission means.

The aim of the present invention is to overcome at least some of the drawbacks in the state of the art as described above.

One aim of the present invention is therefore to propose a plant lifting device which is simple to implement. To this end, the purpose of the invention is a device of the type mentioned above, characterised in that the rotational movement transmission means include at least one rod articulated to the casing on one hand and to the rotor on another hand. This type of movement transmission has the advantage of being comprised of inexpensive parts that require little servicing.

Figure 2:
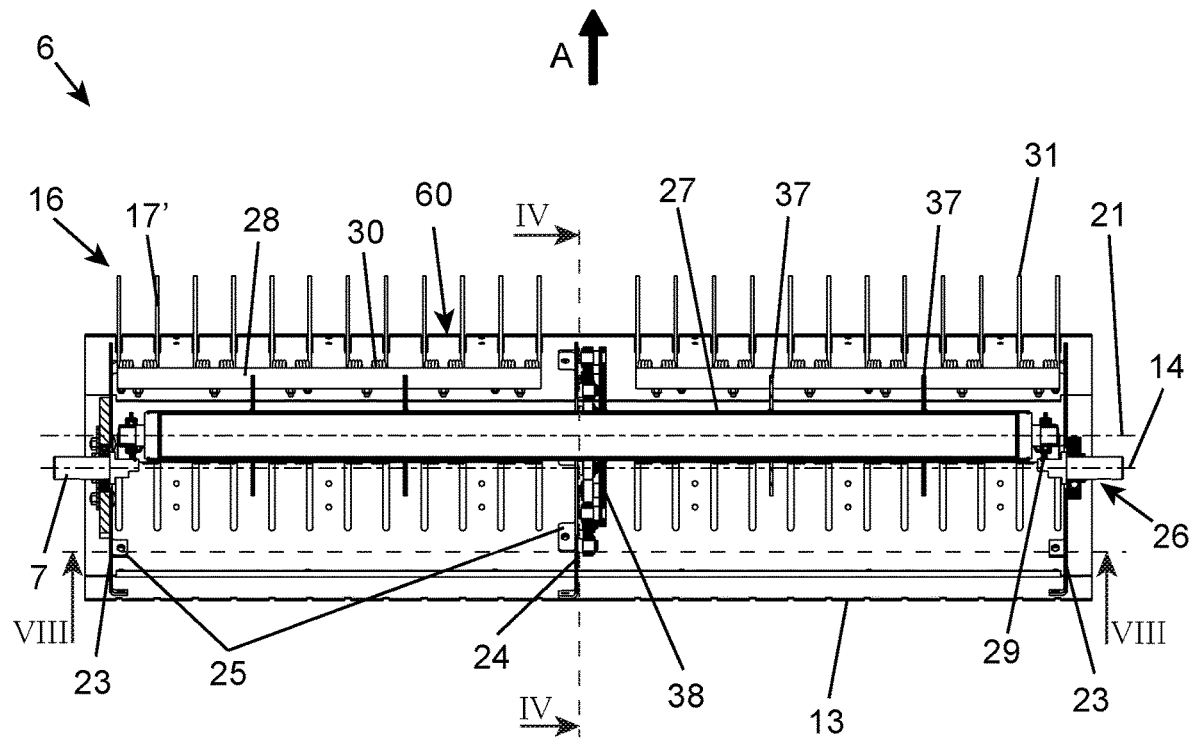
Figure 3:
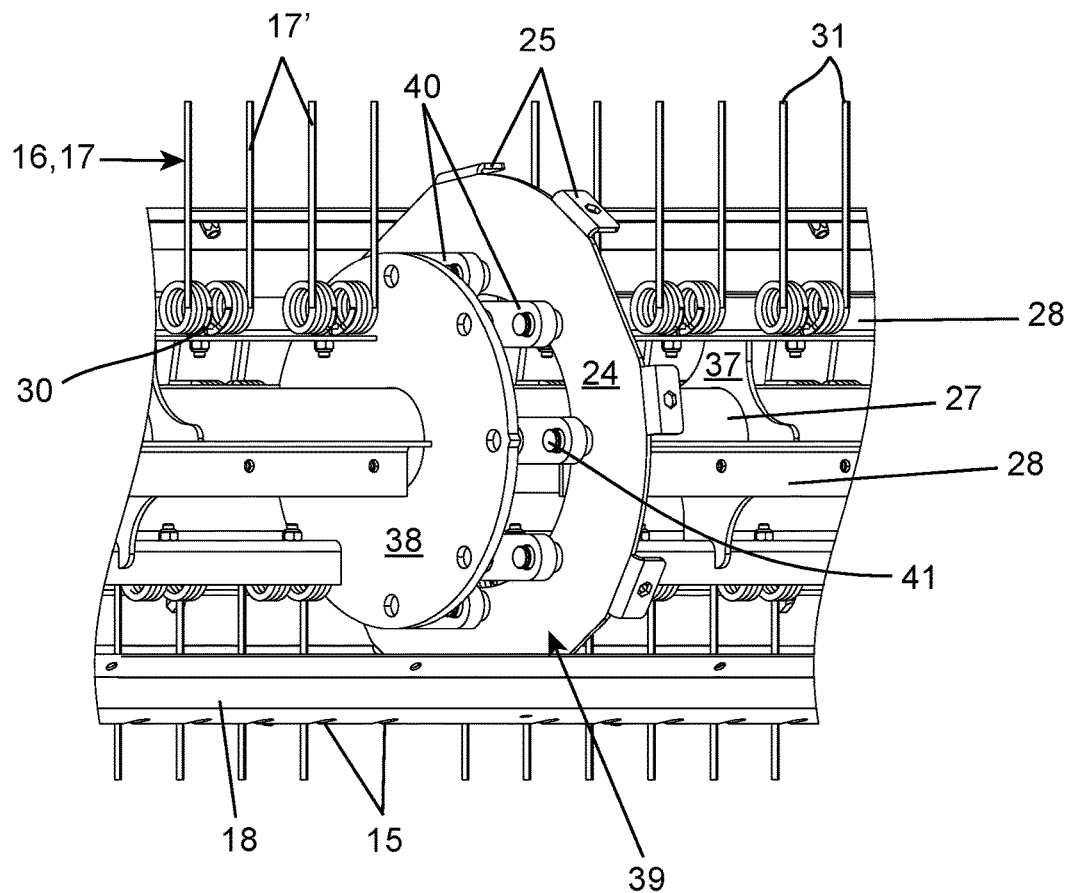
Figure 4:
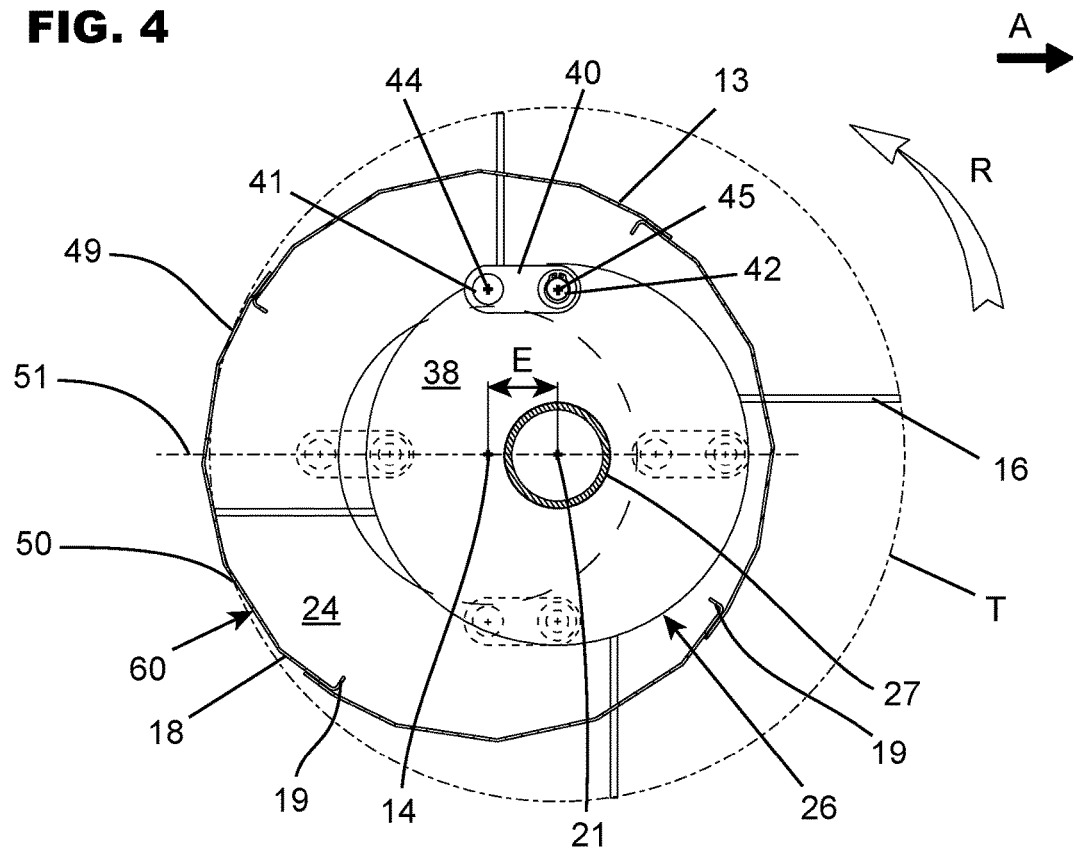
Figure 5:
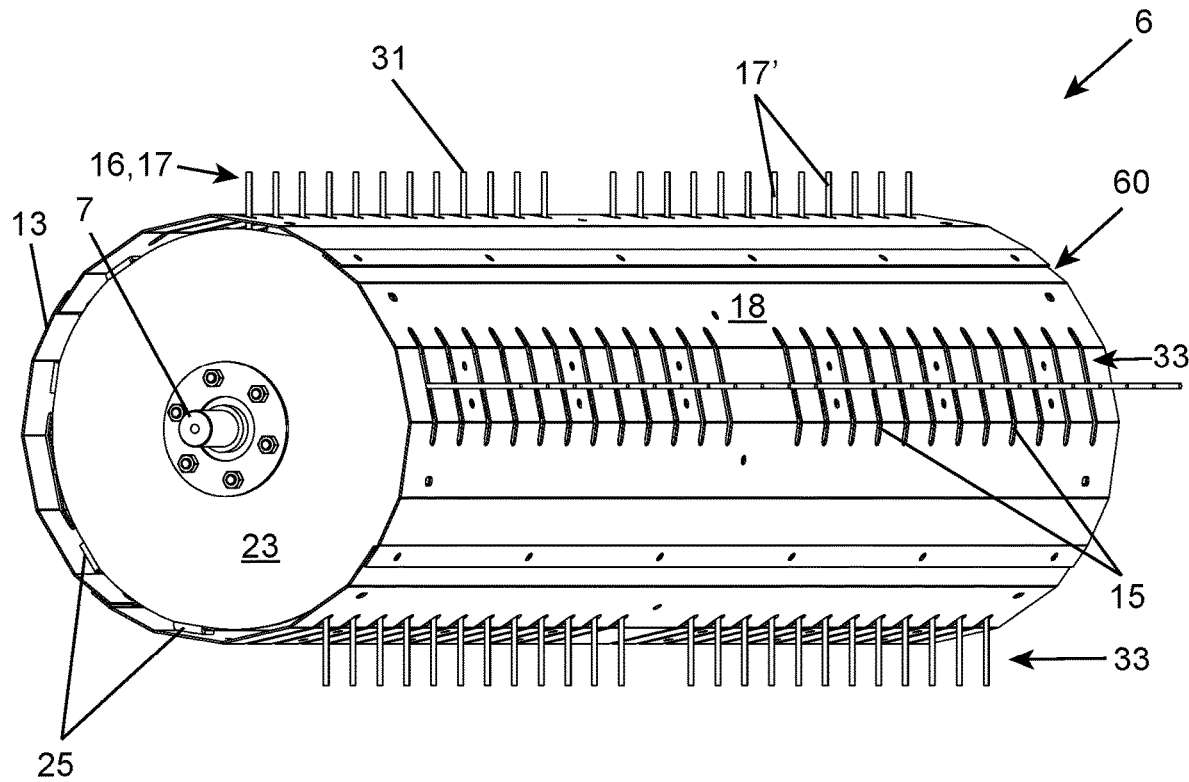
Figure 6:
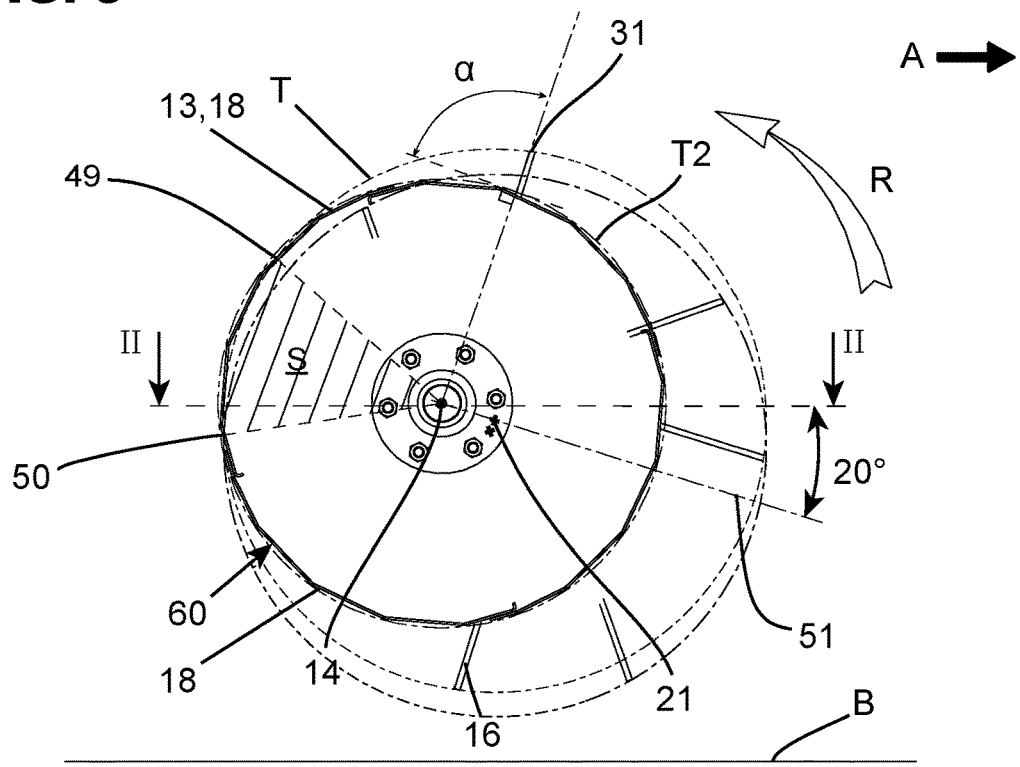
Figure 7:
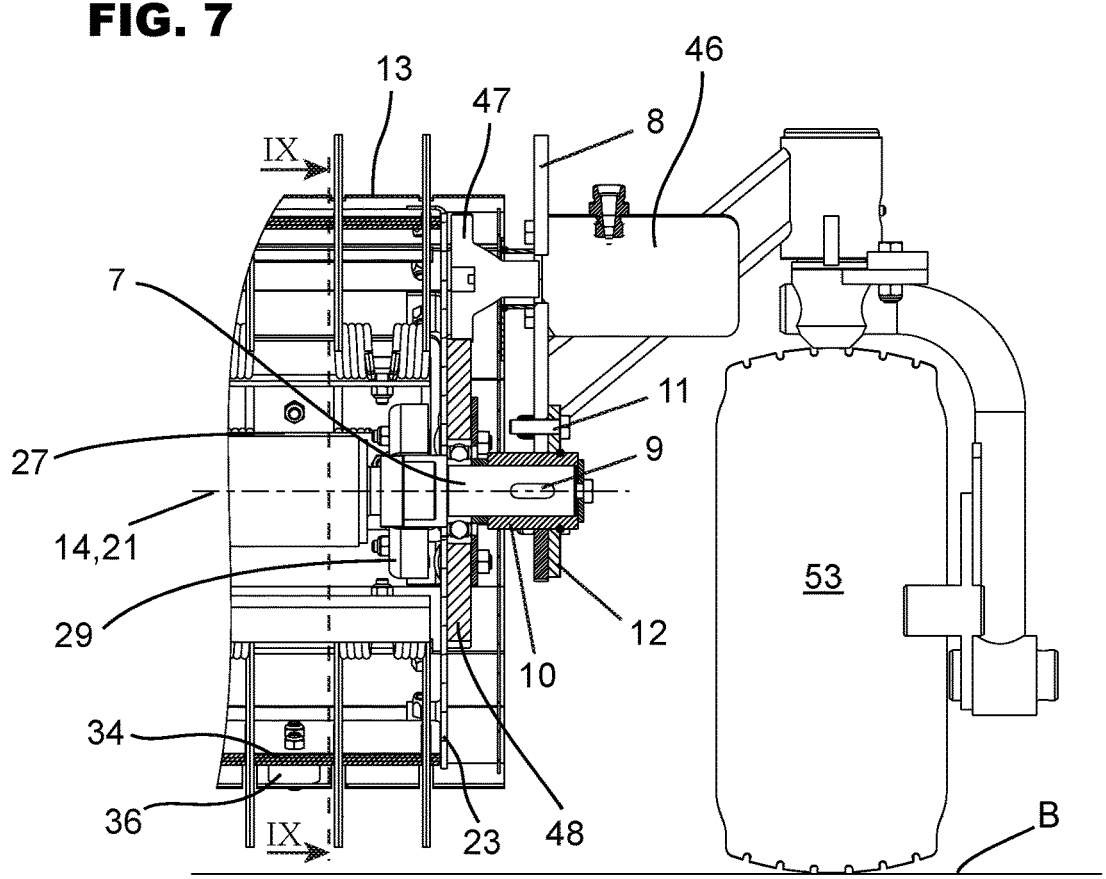
Figure 8:
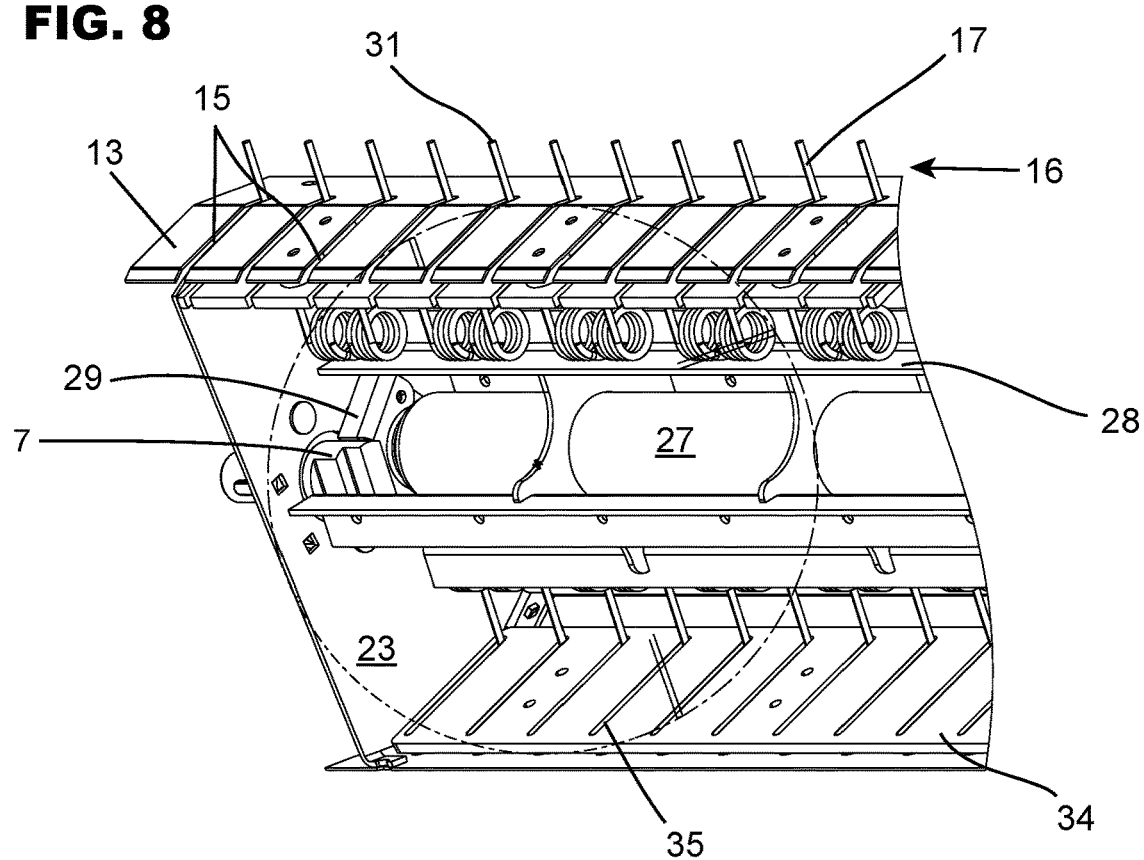
Figure 9:
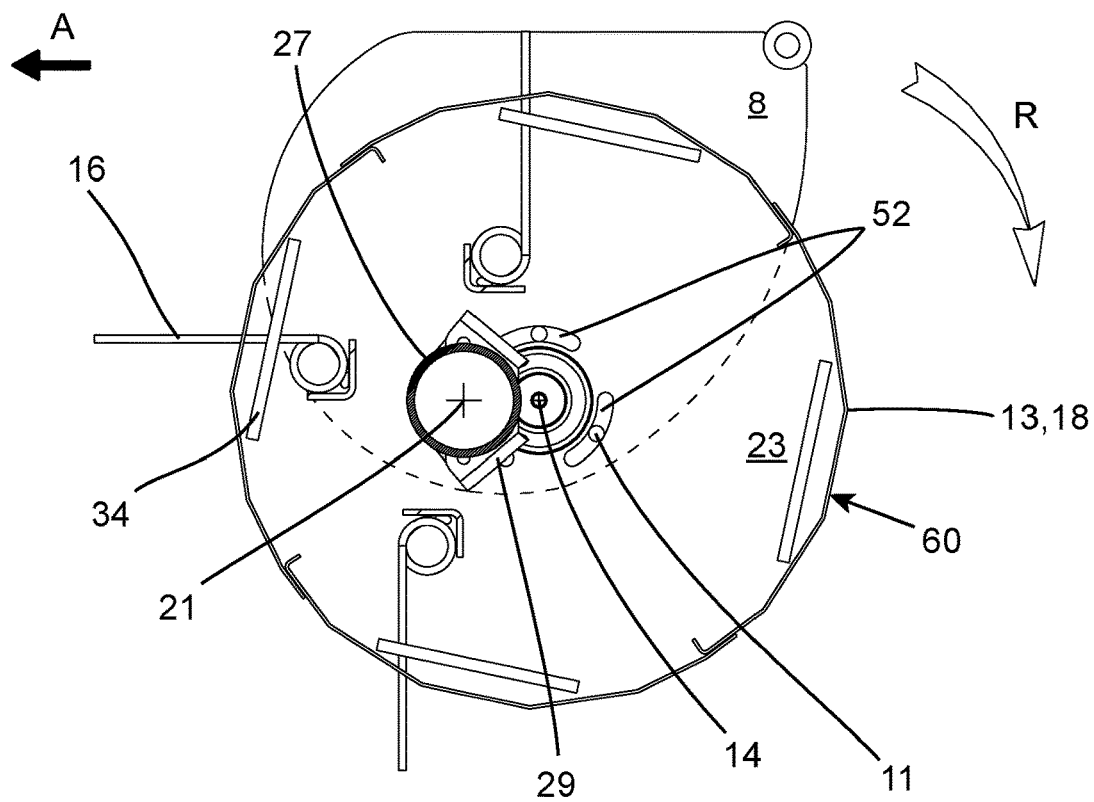
Figure 10:
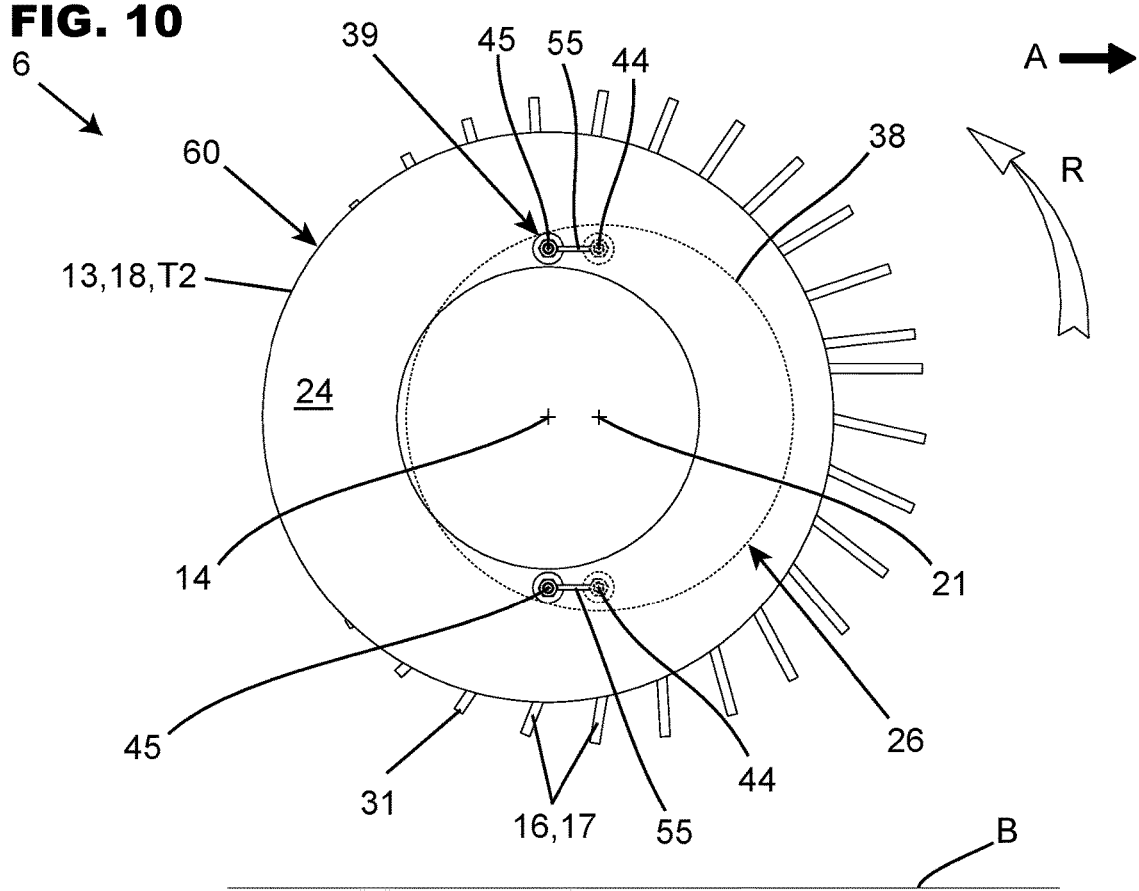
Figure 11:
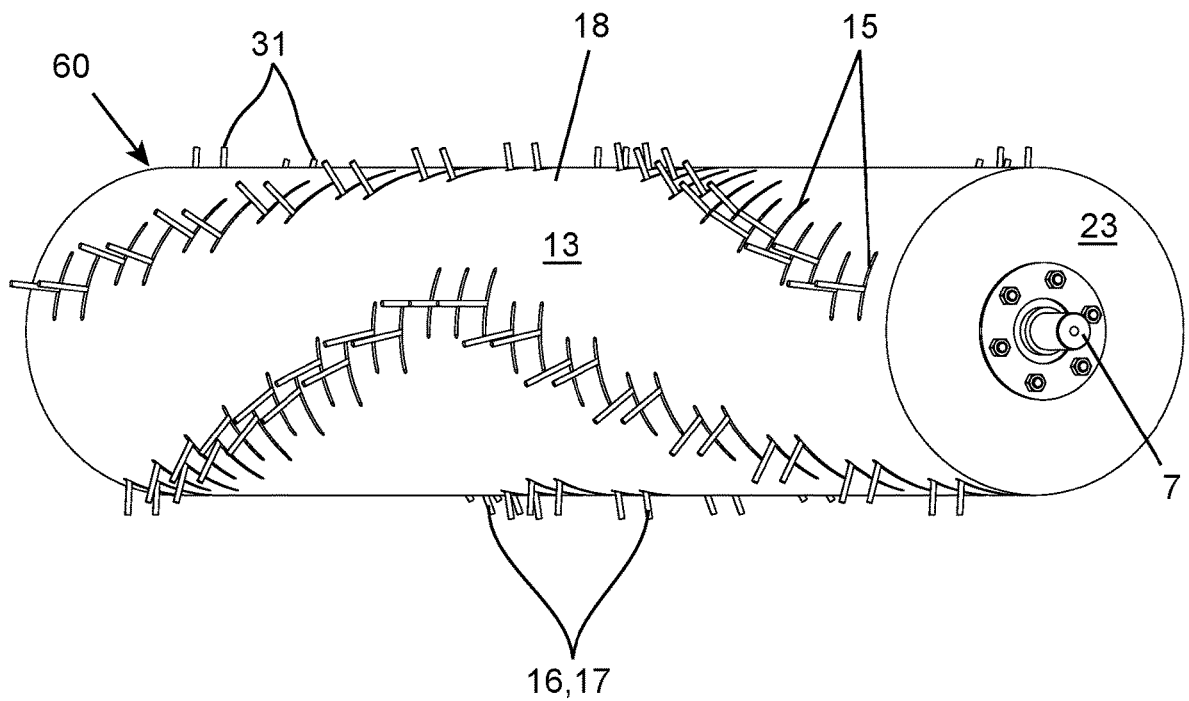
Figure 12:
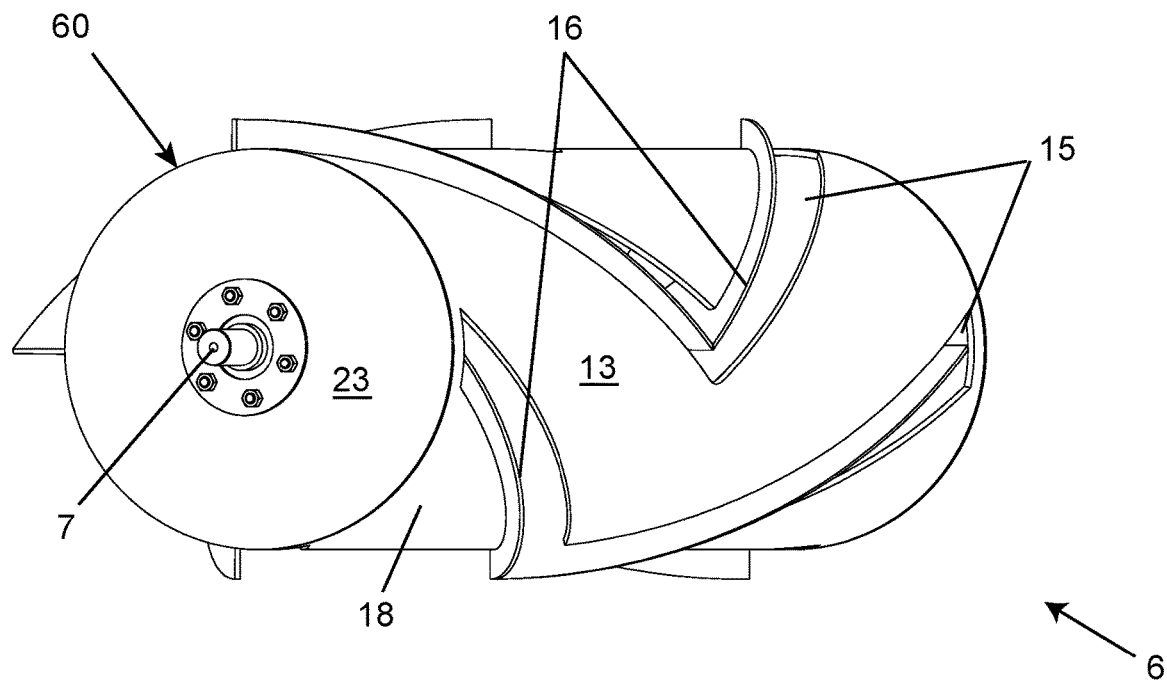
Figure 13:
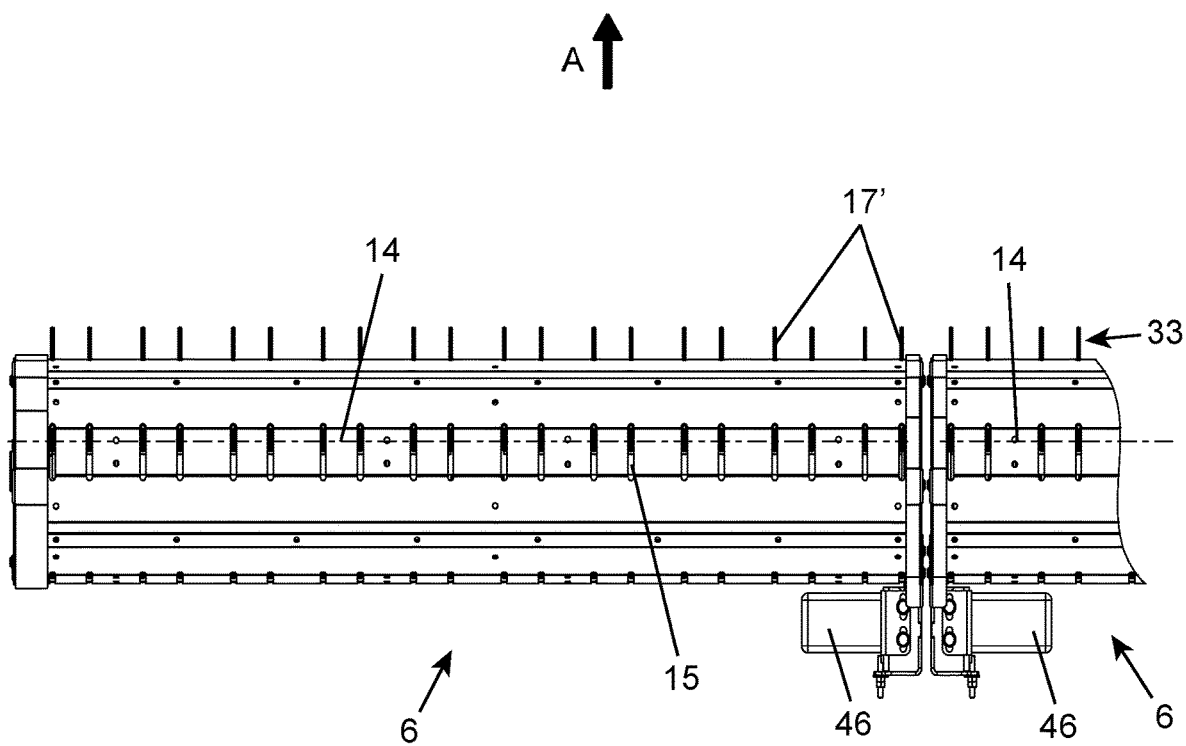
Figure 14:
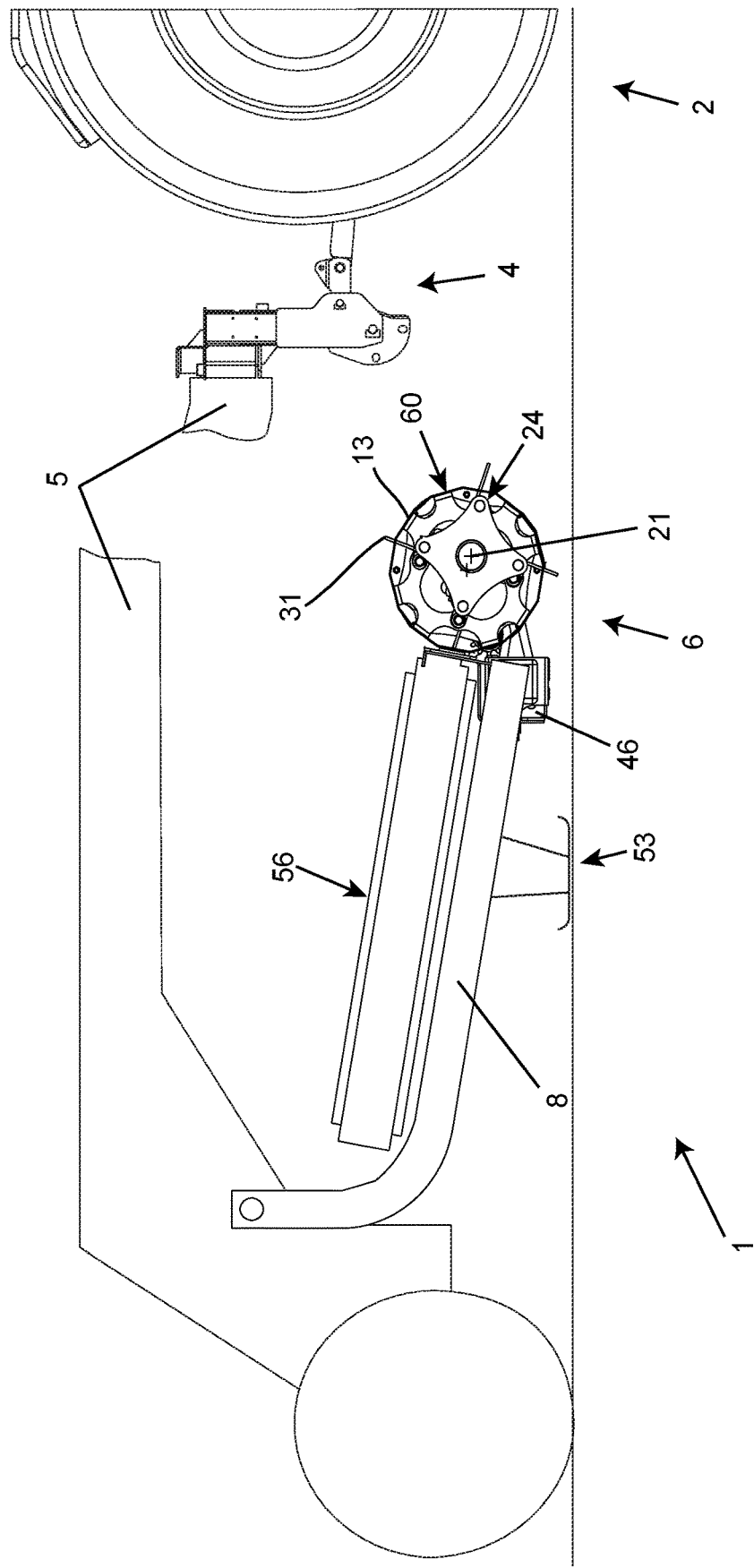

Other features and advantages of the invention will become apparent from the following description and the non-exhaustive example embodiments, explained with reference to the attached schematic drawings, in which:

FIG. 1 is a top view of an agricultural harvesting machine, more specifically a windrower, including a lifting device according to the invention, in which the machine is hitched to a tractor, FIG. 2 is a cross-sectional view of the lifting device, from above, in which supports and forks are concealed for a better understanding, FIG. 3 is a partial perspective view of the lifting device, in which some parts have been concealed for a better understanding, in particular some forks and metal sheets of the casing, FIG. 4 is a side cross-sectional view of the plant lifting device, in which two example embodiments are shown, FIG. 5 is a perspective view of the front part of the plant lifting device, FIG. 6 is a side view of the device, in which the rotation axis of the rotor is brought closer to the ground by rotation around the rotation axis of the casing, FIG. 7 is a partial cross-sectional rear view of an example of connecting the device to a rotational drive supply, FIG. 8 is a detailed cross-sectional perspective view of the lifting device, in which forks have been concealed for a better understanding, FIG. 9 is a cross-sectional side view of the lifting device according to an alternative example embodiment, with the ability to swivel the rotor around the first axis, in which some parts have been concealed for a better understanding, in particular forks and their support, a side flange and the drive means, FIG. 10 is a view similar to that in FIG. 4 according to a second example embodiment, FIG. 11 is a perspective view of a lifting device according to the second example embodiment, FIG. 12 is a view similar to that in FIG. 5 according to a third example embodiment, FIG. 13 is a top view of a device whose drive supply is a motor located at the rear of the device, FIG. 14 is a partial cross-sectional side view of an agricultural harvesting machine fitted with a lifting device and a transverse conveyor at the rear of the lifting device, in which the machine is hitched to a tractor.

Throughout the present document, the notions of front, rear and side are defined from the position of the rear of the machine and looking in a direction of advance A.

FIG. 1 shows an agricultural machine (1) hitched to a tractor (2), or similar agricultural machine, that makes it possible to move it in the direction of advance (A) in which the machine (1) is configured to work. The harvesting machine (1) is shown in the form of a windrower with central deposit, in which raking wheels (3) are driven in rotation around substantially vertical shafts such that they converge at the front. The raking wheels (3) make it possible to gather plants, preferably stranded plants such as grass, cut and lying on the ground (B), in a windrow situated in the centre of the machine (1). A plant lifting device (6) is mounted on the machine (1) between the tractor (2) and the raking wheels (3). In this case, its role is to pick up plants lying on the ground (B) and throw them rearwards and upwards to change their distribution. As such, the plants previously in contact with the ground (B) will not tend to stick to the ground (B) after being in contact with it for a long time. Drying will therefore be more uniform. The device (6) is therefore positioned so as to work the plants situated in a strip that has not been raked by the raking wheels (3). This strip is longitudinal to the direction of advance (A) and centrally positioned between the paths (C) of each raking wheel (3). The machine (1) furthermore includes a chassis (5) fitted with a hitching structure (4) making it possible to connect it to a tractor (2) or similar equipment. The frame (8) of the device (6) is mounted on the chassis (5). The device (6) for its part is mounted on the frame (8) by means of a transmission shaft (7). The transmission shaft (7) is rigidly fastened relative to the frame (8). In an alternative not shown, the device (6) is mounted on a machine (1) hitched to the front of the tractor (2), which prevents the tractor (2) from crushing the plants on the ground (B) before picking them up, thereby further preventing the risk of the plants sticking to the ground (B). When the machine (1) is hitched behind the tractor (2), the hitching structure (4) is arranged at the front end of the chassis (5).

As shown in FIG. 2, the plant lifting device (6) is intended to be assembled to an agricultural machine (1) and in particular includes a drum (60) which is articulated to the frame (8) around a substantially horizontal first axis (14). This drum (60) includes a casing (13). The drum (60) is guided in rotation around the transmission shaft (7). The transmission shaft (7) is positioned such that its axis is coincident with a first axis (14), which is substantially horizontal or substantially parallel to the ground (B) and substantially perpendicular to the direction of advance (A). During operation, the drum (60) is thus driven in rotation around the first axis (14). The casing (13) is therefore articulated to the frame (8) around the first axis (14). The casing (13) is substantially in the form of a straight cylinder. The drum (60) also includes the transmission shaft (7).

The lifting device (6) on the other hand includes a rotor (26) mainly comprised of a central shaft (27) and supports (28) on which are fixed seizing means (16) intended to lift plants situated outside the casing (13).

When the device (6) is operated, the central shaft (27) is kept fixed as regards translatory movement relative to the transmission shaft (7) by at least one support arm (29). The support arm (29) is rigidly fastened to the transmission shaft (7), for example by welding. The central shaft (27) is guided in rotation around a second axis (21) directed substantially parallel to the first axis (14) and separate from the latter. This rotational guidance of the central shaft (27) is performed by at least one ball bearing mounted between the at least one support arm (29) and the central shaft (27). It is therefore clear that, when the device (6) is operated, the second axis (21) is fixed relative to the first axis (14). The rotor (26) is able to be driven in rotation around the second axis (21) relative to the frame (8). The second axis (21) is situated inside the casing (13), at least partially. Preferably, the central shaft (27) is entirely included within the cylinder formed by the casing (13).

The casing (13), among other things, makes it possible to divert and guide the plants lifted by the device (6) to prevent them from winding around the rotor (26). It can therefore be referred to as a guiding or deflecting casing (13). This phenomenon of plants winding around the rotor (26), which can hinder its rotation or even block it, occurs all the less since the casing (13) is driven in rotation.

The casing (13) also has openings (15) through which the seizing means (16) are able to protrude in such a way to be able to lift plants situated outside the casing (13). As such, it is understood that the seizing means (16) can also be immersed in the casing (13), in other words be entirely contained within it.

The plant lifting device (6) furthermore includes transmission means (39) for the rotational movement, i.e. the rotational movement between the drum (60) and the rotor (26). An important feature of the device (6) lies in the fact that the rotational movement transmission means (39) include at least one rod (40) articulated to the drum (60) on one hand and to the rotor (26) on another hand. The or each rod (40) is preferably directly articulated to the rotor (26). The or each rod (40) is also preferably directly articulated to the drum (60). The rotational speed of the drum (60) is thus equal to the rotational speed of the rotor (26).

This type of lifting has the advantage of being easy to carry out and particularly economical. It also prevents the need for frequent servicing that may prove necessary for transmission means that involve chains. This advantage is also obtained thanks to the fact that the plant lifting device (6) does not have a cam. On another hand, the use of at least one rod (40) as a transmission means (39) advantageously allows the option of a relatively short interaxis distance (E) value, while also limiting the size of the transmission means (39). The interaxis distance (E) indicates the distance between the first axis (14) and the second axis (21).

As they are shown in FIGS. 3 and 4, the transmission means (39) also include at least one drive pivot (41) rigidly fastened to the casing (13) and at least one driven pivot (42) rigidly fastened to the rotor (26). The or each drive pivot (41) is fastened to the drum (60), preferably rigidly. Similarly, the or each driven pivot (42) is fastened to the rotor (26), preferably rigidly.

The role of the pivots (41, 42) is to transmit the rotational movement between the drum (60) and the rotor (26). As their manufacturing, their fastening to the casing (13) and their assembly with the or each rod (40) presents no particular difficulty, they advantageously contribute to the rudimentary implementation of the transmission means (39).

In a preferred exemplary embodiment, the transmission means (39) include multiple rods (40) articulated to the drum (60) on one hand and to the rotor (26) on another hand Such an example embodiment enables continuous and smooth lifting. This also enables improved distribution of the transmission forces. Indeed, the higher the number of rods (40), the less force needs to be transmitted per rod (40). The transmission means (39) then include multiple drive pivots (41) and driven pivots (42). Preferably, all of the rods (40) are identical. Preferably, all of the pivots (41, 42) are respectively identical.

To reduce the assembly time and cost price of the device (6), it is conceivable for the transmission means (39) to include any number of rods (40). As such, they can include just one rod (40), as shown in solid lines in FIG. 4. In another example embodiment, the transmission means (39) include three rods (40), shown in this same FIG. 4 in dotted lines, in addition to the single rod (40) shown in solid lines, which therefore brings the total number of rods (40), which can be even or odd, to four. As shown in FIGS. 2 and 3, the transmission means (39) include at least five rods (40) and preferably eight. As each drive pivot (41) and driven pivot (42) are associated with a single rod (40), this preferred scenario would include eight drive pivots (41) and eight driven pivots (42). All of the rods (40) are preferably positioned in a same plane substantially vertical or perpendicular to the first axis (14). Preferably, the rods (40) are evenly distributed radially around the first axis (14), each rod (40) then applying a substantially equal transmission force between the rotor (26) and the drum (60). As shown in FIG. 4, each rod (40) is mounted freely rotatable with the drive pivot (41) around a third axis (44) substantially parallel to the first axis (14). Each rod (40) is also mounted freely rotatable with the driven pivot (42) around a fourth axis (45) substantially parallel to the second axis (21). The lifting device (6) is characterised in that the or each rod (40) is articulated to the drum (60), around the third axis (44) substantially parallel to the first axis (14). Each rod (40) is articulated to the rotor (26) around the fourth axis (45) substantially parallel to the second axis (21). The transmission means (39) are therefore in particular distinguished by this rotational guidance of each rod (40), which affords them remarkable ease of manufacturing and assembly. Each rod (40) therefore operates as a tie-rod, respectively a pushing device, that is oriented in the direction of the plane passing through the third and fourth axes (43, 44) of the rod in question.

It can be noted that each third axis (44) is associated with a rod (40). Conversely, each rod (40) is associated with a third axis (44) Similarly, each fourth axis (45) is associated with a rod (40); and conversely, each rod (40) is associated with a fourth axis (45). Preferably, in a view along the first axis (14), the third axes (44) are evenly distributed around the first axis (14).

In an alternative example embodiment, the drive pivots (41) can pivot relative to the drum (60). In this case, the drive pivots (41) pivot around the third axis (44). The driven pivots (42) could just as well pivot relative to the rotor (26), in which case the driven pivots (42) pivot around the third axis (45).

To simplify the device (6) and standardize the transmission means (39), the device (6) is also characterised in that the first axis (14) is situated at an equal distance from each third axis (44). The second axis (21) is situated at an equal distance from each fourth axis (45).

According to another important feature of the device (6), the distance between the third axis (44) of a rod (40) and the fourth axis (45) of the same rod (40) is equal to the distance between the first axis (14) and the second axis (21). Such an example embodiment advantageously prevents the need for one of the driven pivots (42) or drive pivots (41) having to slide relative to the rod (40) in question. This feature advantageously makes it possible to prevent premature wear of the or each rod (40) and of the pivots (41, 42). This furthermore makes it possible to distribute the forces across the various rods, where applicable. The or each rod (40) thereby operates as a tie-rod transmitting a transmission force, successively a tensile and compressive force, and which is oriented parallel to the plane (51) passing through the first axis (14) and the second axis (21). Given that the first axis (14) is situated at an equal distance from each third axis (44) and that the second axis (21) is situated at an equal distance from each fourth axis (45), it would be the same to emphasize that the distance between the third axis (44) and the first axis (14) is equal to the distance between the fourth axis (45) and the second axis (21). A consequence is that, during operation, the rods (40) are constantly parallel to each other.

As shown in FIG. 10, the or each rod (40) could also be made in the form of a traction element (55) such as a cable or a link chain, etc. The traction element (55) is flexible under compression and cannot transmit force when the third axis (44) is brought closer to the fourth axis (45). When the device (6) is not driven in rotation, the traction element (55) is slack. When the device (6) is operated, the movement of the third axis (44) away from the fourth axis (45) tenses the traction element (55), which then transmits the traction, respectively the rotational movement, between the rotor (26) and the drum (60).

If there is an even number of rods (40), the transmission means (39) then preferentially include at least two third axes (44) diametrically opposed, or substantially opposed, relative to the first axis (14).

The radial dimensions of the rotor (26) are such that they are contained within the volume of the casing (13). In addition, the rotor (26) is sized so that, when it revolves around the second axis (21), the entirety of the rotor (26) remains contained within the casing (13).

This is geometrically characterised in that the minimum distance between the casing (13) and the first axis (14) is less than the sum of the interaxis distance (E) and the distance between the second axis (21) and the fourth axis (45). In practical terms, this means that the minimum distance between the casing (13) and its rotation axis, namely the first axis (14), is less than the sum of the interaxis distance (E) and the radius of the disc (38). Such dimensions of the rotor (26) make it possible to reduce the total dimensions of the device (6). This in particular makes it possible to drive in rotation a device (6) that has a casing (13) of which the external path (T2) forms, in a view along the first axis (14), a circle with a diameter of less than 350 millimetres, more specifically between 300 and 315 millimetres.

The seizing means (16) intended to lift plants located outside the casing (13) are fastened to the rotor (26). The seizing means (16) are preferably rigidly fastened to the rotor (26). In the present description, rigidly fastened means a mechanical connection that does not allow any degree of freedom. The movement of the seizing means (16) is therefore identical to that of the rotor (26). Each seizing means (16) has a base (30) fastened to the rotor (26), as well as an end (31) that can protrude from the casing (13).

As shown in FIGS. 2 to 9, the seizing means (16) can be comprised of multiple forks (17) of a type known in the state of the art. Each fork (17) is comprised of a more or less rigid metal stem, of a preferably substantially circular section. The base (30) of each fork (17) forms coils. At the ends of the coils, along a view longitudinal relative to the second axis (21), begins a substantially rectilinear portion extending in a plane perpendicular to the second axis (21) forming a tooth (17') or a finger that finishes at the end (31). Each fork (17) therefore includes at least one tooth (17'), preferably two teeth (17'). The coils advantageously enable the teeth (17') to deform if they encounter an obstacle. The two teeth (17') of a fork (17) are preferably parallel to each other. In addition to the coils, the base (30) has a loop that allows a standard and solid fastening of a fork (17) to the rotor (26), more specifically on a support (28), using a fixing means such as a screw.

Given that the seizing means (16) are rigidly fastened to the rotor (26), irrespective of the two seizing means (16) in question, the angle between these two seizing means (16) is constant projected along a plane perpendicular to the second axis (21). This means that this angle remains unchanged when the rotor (26) revolves. It is understood that a deformation of the seizing means (16) is not taken into account when measuring the angle between two seizing means (16).

Given that the seizing means (16) are rigidly fastened to the rotor (26), they can be distributed in any manner on the circumference of the casing (13). As shown in FIGS. 2 to 9, the seizing means (16) form rows (33). The device (6) can include any number of rows (33). Preferably, from a side view, the seizing means (16) are angularly distributed around the second axis (21) in an even manner, so that the plants can be lifted at an even pace. In the example shown in FIGS. 2 to 9, the lifting device (6) includes four rows (33) of forks (17), which are consequently offset by 90° relative to each other around the second axis (21). In the example embodiment shown in FIGS. 2 to 9, the teeth (17') are substantially coplanar in a same row (33). In a row (33), the forks (17) are arranged at regular intervals. In a same row (33), the forks (17) are preferably arranged in such a way that the teeth (17') are spaced at regular intervals.

The dimensions of the transmission means (39) measured longitudinally relative to the first axis (14) are such that the transmission means (39) can be integrated between two planes perpendicular to the first axis (14) and the gap between these two planes is less than the gap between two seizing means (16) measured longitudinally relative to the first axis (14). The plants lying on the ground (B) can therefore be uniformly lifted across the entire working width of the device (6), even if the transmission means (39) are integrated on the working width.

It is nevertheless possible, for reasons of dimensions, for the interval between the central forks (17) to be different from the others.

The device (6) can be transferred between a work configuration and a transport and/or manoeuvre configuration. In the operation configuration, the device (6) is lifted off the ground (B). In the transport configuration, the distance between the device (6) and the ground (B) is greater than in the work configuration. It is also possible, in the transport configuration, for the device (6) to be rotated in order to make the machine (1) more compact.

In the example embodiment shown in FIGS. 2 and 5, the gap between the seizing means (16), respectively the forks (17), situated at the level of the chassis (5) is such that it makes it possible to bring the casing (13) as close as possible to the chassis (5) in a transport and/or operation configuration. Thus, it is possible to achieve a greater ground clearance—the distance between the device (6) and the ground (B)—in these configurations. To this same end, the chassis (5) could also be fitted with a protruding structure in the location of the device (6).

To improve the effectiveness of the lifting of plants lying on the ground (B), the forks (17) of a row (33) can be offset longitudinally relative to the first axis (14) with regard to the forks (17) of the other rows (33). As shown in FIGS. 10 to 12, the seizing means (16), respectively the forks (17), can, viewed from the top of the device (6), form chevrons or Vs to ensure a consistent quantity of plants projected by the seizing means (16).

The teeth (17') are substantially oriented along a radius of the rotor (26). This type of seizing means (16) has the advantage of being comprised of standard and inexpensive components, performing uniform lifting and uniformly picking up the plants lying on the ground (B).

Alternatively, the seizing means (16) can be comprised of teeth (17') having one or several curvature(s) or fold(s). These teeth (17') can for example also be fastened in an isolated manner to the rotor (26) and be diametrical and/or of a polygonal cross-section. As shown in FIG. 12, it is also possible for the seizing means (16) to be comprised of walls such as cloths, brushes or plates, flexible or otherwise, that would be mounted instead of several forks (17).

The openings (15) made in the casing (13) enable the seizing means (16) to pass through the latter so that they are able to lift the plants situated outside the casing (13). Preferably, the dimensions of the openings (15) are such that the seizing means (16) do not come into contact with the casing (13) during normal operation of the device (6). Such a feature has the advantage of not causing premature wear to the seizing means (16) and/or the wall of the openings (15). The openings (15) are such that they enable each seizing means (16) to switch between two end-positions relative to the casing (13). These two positions are conferred on the seizing means (16) by the rotation of the rotor (26) and determined, among other factors, by the value of the interaxis distance (E).

As the rotational speed of the casing (13) is equal to that of the seizing means (16), each opening (15) is associated with a seizing means (16). In turn, each seizing means (16) is associated with an opening (15). In the example embodiment shown in FIGS. 5, 8 and 11 in particular, each tooth (17') is associated with an opening (15), and each opening (15) is associated with a fork (17) tooth (17') such that the casing (13) does not have any other hole, thereby limiting the surface through which plants could enter inside the casing (13). In this example embodiment, the openings (15) are formed in the casing (13) such that their longitudinal dimension extends in a plane substantially vertical and substantially perpendicular to the second axis (21). Each opening (15) is of a width slightly greater than the width—or diameter—of the fork (17) tooth (17') with which it is associated. As such, the openings are not peripheral in the same way as the lifting device (6) fitted with deflectors or strippers. The size of each opening (15) is thereby advantageously reduced so as to prevent plants entering inside the casing (13). Furthermore, the limitation of the size of each opening (15) parallel to the direction of advance (A) advantageously prevents a seizing means (16) from fully entering inside the casing (13) following a major deformation caused by encountering an obstacle.

According to an alternative shown in FIG. 12, the longitudinal dimension of the openings (15) extends transversely relative to the direction of advance (A). Each opening (15) can allow several seizing means (16) to pass through. This example embodiment makes it possible to reduce the weight of the casing (13) and to facilitate access to the components located inside.

The device (6) is operated when the rotor (26) is driven in rotation by a drive supply (46). According to the example embodiment shown in FIG. 7, the drum (60) drives the rotor (26) in its wake. However, the present description indicates that the rotational movement transmission means (39) enable the rotation of the rotor (26) to be transmitted to the drum (60) and vice versa. Thus, an important feature of the device (6) is that it can be mounted in such a way that the drum (60) drives the rotor (26) or vice versa.

As shown in FIG. 7, the rotor (26) is driven in rotation by a motor that is fixed relative to the frame (8), which can for example be electric or hydraulic. On the shaft of the motor is fastened a pinion (47) which meshes with a gearwheel (48) fastened to the drum (60), via fixing means. However, it would also be possible to operate the device (6) by means of a drive supply (46) carried out by an angle gearbox that would be assembled instead of the motor and connected to the power take-off shaft of a tractor (2) via a telescopic cardan shaft. As shown in FIG. 7, each end of the casing (13) can be obstructed by a cover that prevents plants winding around the transmission shaft (7). To the same end, there can also be provided a spacer fastened to this cover and surrounding the shaft of the motor fastened to the pinion (47).

To be able to place several devices (6) side by side on a same machine (1) such that their first respective axes (14) are aligned and such that the space between two consecutive devices (6) is minimal, it is conceivable to position the drive supply (46) at the rear of the device (6), viewed in the direction of advance (A), as shown in FIGS. 13 and 14. The gearwheel (48) is then driven by a chain.

The casing (13) can be formed of at least one sheet (18) shaped so as to form a cylinder similar to the shape of a straight circular cylinder, as shown in FIGS. 10 to 12. As FIGS. 4, 6 and 9 in particular show, the casing (13) can be comprised of several sheets (18) folded such that once assembled, they substantially form a straight cylinder the base of which is a regular polygon and the edges of which are parallel to the first axis (14). These sheets (18) overlap each other on an area along the generating line of the cylinder of the casing (13). To increase the strength of the casing (13), the sheets (18) can also be folded such that one part forms a substantially radial rib (19). The sheets (18) are preferably made in metal, although they can also be made from another material. An important feature of the device (6) is that the casing (13) is formed of sheets (18) assembled in a removable manner. This method of manufacturing the casing (13) has the advantage of being particularly simple and inexpensive, while allowing easy removal of the casing (13), respectively of a sheet (18), in order to easily access the interior, in particular to replace seizing means (16).

FIGS. 2 and 5 show that a side flange (23) is rigidly fastened to the casing (13) nearby each of its ends. At least one central flange (24) is furthermore rigidly fastened to the casing (13), for example substantially in the middle of its longitudinal dimension. Each flange (23, 24) is for example a metal sheet positioned substantially perpendicular to the first axis (14). The flanges (23, 24) have lugs (25) that enable them to be fastened to the drum (60), more specifically to the casing (13). Each side flange (23) furthermore has a hole through which the transmission shaft (7) passes through. The central flange (24) allows the central shaft (27) to pass through a similar hole. The side flanges (23) prevent plants entering inside the casing (13) while serving as a support for it. The central flange (24) enables the rotation of the drum (60) to be transmitted to the rod(s) (40) and, where applicable, vice versa, the rotation of the rod(s) (40) to the drum (60). Thus, the drum (60) includes the central flange (24). It also includes the side flanges (23). Preferably, the or each rod (40) is directly articulated to the central flange (24).

According to the example embodiment shown in FIG. 2, the transmission shaft (7) is comprised of two lateral shafts acting as though they were one, each positioned at one end of the casing (13). The transmission shaft (7) is therefore divided into two shafts that are separate from each other and mounted such that their respective axes are coincident. This example embodiment advantageously prevents interference with the parts driven in rotation, in particular the rotor (26) and the transmission means (39). Another solution for the transmission shaft (7) would be to be carried out in one single part. In all cases, the drum (60) is guided in rotation, for example by ball bearings mounted on the transmission shaft (7) nearby the side flanges (23).

As shown in FIG. 4, the distance between one end (31) and the contour of the casing (13) changes during one revolution of the rotor (26). Thus, each end (31) describes a path (T). Preferably, all of the seizing means (16) are fastened equidistant from the second axis (21). They are preferably all of the same dimension. The path (T) of an end (31) is a circle centred on the second axis (21) projected on a plane perpendicular to the second axis (21). In the example embodiment shown in FIG. 4, the seizing means (16) and the casing (13) are sized such that during a revolution of the casing (13), each end (31) penetrates the casing (13) at a retraction point (49) and re-emerges at a deployment point (50). In this way, when the rotor (26) is driven in rotation, for example in the direction of rotation (R) as shown in FIG. 6, the path (T) includes the following phases:
  an immersion phase, during which the end (31) does not protrude from the casing (13), as shown in FIG. 6 by the shaded part of an angular sector (S);
  a seizing means (16) deployment phase, during which the distance between the end (31) and the casing (13) increases;
  a seizing means (16) retraction phase, during which the distance between the end (31) and the casing (13) decreases.

The device (6) is also characterised in that, during one complete revolution of the rotor (26), there is, projected along a plane perpendicular to the first axis (14), an angular sector (S) in which the ends (31) of the seizing means (16) do not protrude from the casing (13). This angular sector (S), shown in FIG. 6, is delimited by two planes passing through the first axis (14). Thus, when, projected along a plane perpendicular to the first axis (14), the ends (31) are situated between a first straight line passing through the first axis (14) and the retraction point (49) and a second straight line passing through the first axis (14) and the deployment point (50), the ends (31) then being situated inside the casing (13). The retraction (49) and deployment (50) points are preferably separate from each other. The length of the angular sector (S) depends, among other factors, on the value of the interaxis distance (E), which can be advantageously chosen so as to achieve the desired dimension of the angular sector (S), notably if the diameter of the external path (T2) of the casing (13) and the diameter of the path (T) of the ends (31) are defined.

A tooth angle ($\alpha$) is formed by a seizing means (16) and the tangent to the external path (T2) of the casing (13) as it revolves around the first axis (14) at the level of a point at which the casing (13) and the seizing means (16) in question cross, projected along a plane perpendicular to the first axis (14). The tooth angle (a) is positioned at the front of the seizing means (16) in question relative to the direction of rotation (R) shown in FIG. 6.

In the example embodiment shown in FIG. 6, during the retraction phase of a seizing means (16), the tooth angle ($\alpha$) moves between 85° and 105°, more precisely between 89° and 102°. During operation, the plants lifted by the device (6) and located on the periphery of the casing (13) are mostly at the front of the seizing means (16). Thus, the seizing means (16) do not press the plants towards the casing (13), thereby advantageously preventing them from entering the casing (13).

In addition, as the rotational speed of the casing (13) and of the seizing means (16) is identical, the relative speed of the seizing means (16) relative to the casing (13) is low, thereby also decreasing the force exerted by the seizing means (16) on the plants and directed radially to the casing (13).

In the example embodiment of the machine (1) shown in FIG. 14, a transverse conveyor (56) is assembled at the rear of the device (6) so as to receive the plants projected by the device (6). The transverse conveyor (56) enables the plants to be deposited in a windrow directed parallel to the direction of advance (A). Thanks to the angular sector (S) in which the ends (31) are contained within the casing (13), the transverse conveyor (56) can be placed as close as possible to the device (6), respectively the casing (13), thereby advantageously preventing the loss of plants in this space.

As shown in FIGS. 7, 8 and 9, it is also planned that the drum (60) can be fitted with teeth (17') guide plates (34). These plates (34) have elongated openings (35) oriented parallel to the openings (15) made in the casing (13). An elongated opening (35) has a width very slightly greater than the width—or diameter—of the tooth (17') with which it is associated. The width of an elongated opening (35) is slightly less than the width of an opening (15) made in the casing (13). The plates (34) to guide the fork (17) teeth (17'), and respectively the elongated openings (35), thereby enable each tooth (17') to be held in the direction of the opening (15) with which the tooth (17') in question is associated, during the immersion phase of the ends (31). The guide plates (34) are mounted inside the casing (13) and fastened thereto. It is also possible to assemble one or several spacers (36) between each plate (34) and the casing (13). Thus, the drum (60) includes, where applicable, the spacers (36).

In the example embodiment shown in FIGS. 2 and 3, the rotor (26) includes supports (28) fastened to the central shaft (27) by means of hubs (37). The supports (28) are L-shaped profiles, positioned parallel to the second axis (21), respectively to the central shaft (27), and carrying multiple forks (17). Each support (28) is thus associated with a row (33). This assembly has the advantage of being comprised of standard parts. However, the supports (28) may be of different shapes, for example forming a cylinder surrounding the second axis (21).

As shown in FIGS. 2, 3 and 4, there is also provided at least one disc (38) rigidly fastened to the central shaft (27) and enabling the rotation of the rod(s) (40) to be transmitted to the rotor (26) and, where applicable, vice versa, from the rotor (26) to the rod(s) (40). The rotor (26) thus also includes the disc (38) and the hubs (37). Preferably, the or each rod (40) is directly articulated to the disc (38). The disc (38) is for example welded to the central shaft (27) nearby the middle of the longitudinal dimension of the latter and perpendicular to it. To avoid hindering the rotation of the revolving parts such as the seizing means (16), the supports (28) extend from the vicinity of a side flange (23) to nearby the disc (38), respectively the central flange (24), without coming into contact with the latter. It becomes apparent from the present description that the device (6) is also characterised in that the transmission means (39) also include at least one central flange (24) rigidly fastened to the casing (13) and at least one disc (38) rigidly fastened to the rotor (26). This arrangement enables the size of the transmission means (39) to be reduced, while allowing a wide range of values of the interaxis distance (E). The transmission means (39) are thus advantageously contained within the casing (13).

As shown in FIGS. 4 and 6, the device (6) is also characterised in that the second axis (21) is situated in front of the first axis (14) as viewed in the direction of advance (A). This characteristic enables the seizing means (16) to protrude from the casing (13) when they lift the forage. This in fact enables the plants previously lifted from the ground (B) to be conveyed by the seizing means (16) to the front of the device (6), in such a way as to project them above in a direction opposite to the direction of advance (A) in order to reduce the risk of plant loss due to the movement of the machine (1). Additionally, in case the machine (1) would be fitted with a regaining device, such as for example the transverse conveyor (56), this arrangement of the axes (14, 21) enables the regaining device to be brought as close as possible to the plant lifting device (6), due to the fact that the immersion phase of the ends (31) and the angular sector (S) are then situated at the rear of the device (6).

Additionally, the second axis (21) is preferably situated lower than the first axis (14), as shown in FIG. 6. Thus, the plane (51) passing through the first axis (14) and the second axis (21) is tilted forwards. The angle between the plane (51) and the ground (B) is preferably between 0° and 30°, and more precisely substantially between 15° and 25°. Such an orientation of the device (6) enables the retraction point (49) to be moved forwards and upwards relative to the ground (B), according to the orientation of the plane (51), which reduces the risk of driving plants at the rear of the casing (13) towards the ground (B). Additionally, such a positioning of the retraction point (49) prevents plants entering the casing (13) when the seizing means (16) are in the retraction phase.

As shown in FIG. 7, the transmission shaft (7) is kept fixed in a rotational manner relative to the frame (8) by a fitted key (9) clamped in a grooved sleeve (10). The sleeve (10) is rigidly fastened to the frame (8) by means of a collar (12) forming part of this sleeve (10), using fixing means (11) that are preferably easily removable. In the example shown in FIG. 7, these fixing means (11) are screws that pass through the collar (12) of the sleeve (10) and the frame (8) of the device (6). In an alternative example embodiment shown in FIG. 9, the frame (8) can have circular oblong holes (52) for passing through the fixing means (11) making it possible to move the rotor (26) around the first axis (14). Thus, by freeing up the fastening of the rotor (26) relative to the frame (8), it is possible to revolve the rotor (26) around the first axis (14), in particular driving the support arm (29) and the transmission shaft (7) with it. This adjustment system thus enables the plane (51) to be oriented relative to the ground (B). The device (6) is then also characterised in that an adjustment system makes it possible to move the second axis (21) around the first axis (14). This adjustment advantageously makes it possible to angularly move the retraction point (49) on the circumference of the casing (13).

It is understood in this document that a "substantially perpendicular" orientation of one axis or plane relative to a second axis or plane means that they form an angle between 45° and 135°, preferably between 70° and 110° and even more precisely between 85° and 95°. Identically, the "substantially horizontal" orientation of an axis or plane can include an angle, between the plane of the ground (B) and the axis or plane in question, between −45° and 45°, preferably between −20° and 20° and even more precisely between −5° and 5°.

In another not shown example embodiment of the device (6), an elastically deformable means is mounted between the frame (8) and the rotor (26) such that, when the rotor (26) is subject to an upward force, it can move around the first axis (14) and return to its initial position thanks to the forces exerted by the elastically deformable means.

In a different not shown example embodiment, an actuator such as a jack or similar device can be fitted between the frame (8) and the rotor (26) in such a way that the angular position of the rotor (26) can be adjusted around the first axis (14) when the device (6) is operated.

When it enables the picking-up of previously cut plants lying on the ground (B), this lifting device can also be called a pick-up device. The purpose of the invention is also a plant lifting device (6) characterised in that the device is a pick-up device enabling the picking-up of plants lying on the ground (B). In this case, the device (6) includes at least one ground (B) support means (53) such as a skid or wheel. In FIGS. 1 and 7, this means is shown by a wheel guided in rotation relative to the frame (8) and resting on the ground (B). This support means (53) can enable the distance between the first axis (14) and the ground (B) to be adjusted. Its purpose is also to enable the device (6) to better cope with potential uneven terrain surfaces. Lastly, it can also make it possible to move the device (6) between the work configuration and another configuration.

The purpose of the invention is also an agricultural harvesting machine (1) characterised in that it includes at least one plant lifting device (6) as described in the present description.

Such a machine (1) is in particular intended to be hitched, as shown in FIG. 1, to the rear of a tractor (2) or similar agricultural machine. Machines with such a lifting device can for example be balers, choppers, windrowers, grouping equipments or windrow aerators. In these machines, the direction of rotation (R) of the rotor (26), as shown in particular in FIG. 4, is such that the lowest seizing means (16) move in the direction of advance (A), in such a way so as to collect plants lying on the ground (B) and project them to the rear above the device (6). According to the use for which the device (6) is intended, the rotor (26) and the drum (60) can be driven in a direction of rotation (R) and/or in the opposite direction. The machine (1) can also be a self-propelled vehicle, such as a combine harvester for example.

In a combine harvester, the device (6) can be used to pick-up plants lying on the ground (B), but also as a 'lifter' or 'bringer', combined or otherwise with an auger. In the latter case, the seizing means (16), rather than picking-up the plants from the ground (B), seize them in the air in order to pull them down and drive them to the inside of the machine (1).

The invention is of course not limited to the example embodiments described and shown in the attached drawings. Modifications remain possible, in particular as regards the composition of the various elements and by substituting technical equivalents without departing from the scope of protection of the invention.

The invention claimed is:

1. A plant lifting device intended to be mounted on an agricultural machine and including in particular:
   a drum that is articulated to a frame around a first substantially horizontal axis and which includes a substantially cylindrical casing that has openings through which seizing means intended to lift plants situated outside the casing are able to protrude,
   a rotor onto which the seizing means are fastened and that is able to be driven in rotation relative to the frame around a second axis directed substantially parallel to the first axis and separate from it, in which, when the device is operated, the second axis is fixed relative to the first axis,
   and rotational movement transmission means,
   wherein, the rotational movement transmission means include at least one rod directly articulated to the drum around a third axis substantially parallel to the first axis, the at least one rod also being directly articulated to the rotor around a fourth axis substantially parallel to the second axis, and
   wherein the seizing means are rigidly fastened to the rotor such that, projected along a plane perpendicular to the second axis, irrespective of any two seizing means fastened to the rotor, the angle between the two seizing means is constant.

2. The plant lifting device according to claim 1, wherein the transmission means include multiple rods articulated to the drum at each of their first ends and to the rotor at each of their second ends.

3. The plant lifting device according to claim 1, wherein the first axis is situated at an equal distance from each third axis and in that the second axis is situated at an equal distance from each fourth axis.

4. The plant lifting device according to one claim 1, wherein at least two third axes are diametrically opposed relative to the first axis.

5. The plant lifting device according to claim 1, wherein an interaxis distance is a distance between the first axis and the second axis, and wherein the minimum distance between the casing and the first axis is less than the sum of the interaxis distance and the distance between the second axis and the fourth axis.

6. The plant lifting device according to claim 1, wherein the seizing means are comprised of multiple forks with two teeth and of which the base forms coils.

7. The plant lifting device according to claim 1, wherein it can be arranged in such a way that the drum drives the rotor or vice versa.

8. The plant lifting device according to claim 1, wherein the casing is formed of metal sheets assembled in a removable manner.

9. The plant lifting device according to claim 1, wherein the second axis is situated in front of the first axis as viewed in a direction of advance in which the machine is configured to work.

10. The plant lifting device according to claim 1, wherein an adjustment system comprising screws passing through circular oblong holes in the frame makes it possible to move the second axis around the first axis.

11. The plant lifting device according to claim 6, wherein each tooth is associated with an opening and each opening is associated with a tooth such that the casing does not have any other hole.

12. An agricultural harvesting machine wherein it includes at least one plant lifting device as described in claim 1.

* * * * *